Patented May 11, 1937

2,080,384

UNITED STATES PATENT OFFICE 2,080,384

PRODUCTION OF SULPHUR

Bernard M. Carter, Montclair, N. J., assignor to General Chemical Company, New York, N. Y., a corporation of New York No Drawing. Application April 21, 1932, Serial No. 606,757

12 Claims. (Cl. 23—226)

This invention relates generally to the reduction of sulphur dioxide to sulphur and/or hydrogen sulphide. The invention contemplates chiefly the reduction of sulphur dioxide to elemental sulphur, and accordingly, for convenience, the invention is hereinafter described in connection with the production of elemental sulphur, although it is to be understood that the principles of the present improvements apply to the formation of hydrogen sulphide if such end product is desired.

More particularly, the invention relates to a process for the production of elemental sulphur from sulphur dioxide or gas mixtures containing the same. In the more limited aspects, the invention is directed to the production of sulphur from sulphur dioxide gas mixtures evolved in the decomposition of sulphuric acid sludges constituting waste products of numerous oil refining processes, and especially comprehends the reduction of sulphur dioxide by means of a reagent-catalyst comprising the solid carbonaceous residue also formed in the decomposition of acid sludges. The invention is further directed to methods for the recovery of sulphur as such from acid sludges.

Processes for the production of sulphur from sulphur dioxide gas mixtures by contacting the sulphur dioxide, at elevated temperatures, with carbonaceous reducing agents have heretofore been proposed. Such processes, however, comprise a reduction reaction effected at high temperatures, as distinguished from the method of the present invention, according to which reduction may be readily accomplished at relatively low temperatures. Several processes have also been suggested for the recovery, from acid sludges, of sulphur as sulphur dioxide. Such latter operations involve, generally speaking, decomposition or destructive distillation of acid sludges by heating, with the evolution of gas mixtures containing sulphur dioxide, and accompanying formation of solid carbonaceous residues of varying composition.

One of the principal objects of the invention lies in the provision of a process for producing elemental sulphur from sulphur dioxide or sulphur dioxide containing gas mixtures by a reducing reaction which may be carried out at lower temperatures than heretofore. Another object contemplates the provision of a method for the reduction of sulphur dioxide to sulphur in a reaction, involving the use of hydrocarbon reducing agents, carried out in such manner as to bring about relatively complete reduction of sulphur dioxide to sulphur. Among other features, the invention further aims to provide a method for the recovery from acid sludges of sulphur in the elemental form. Additional objects and advantages of the invention will hereinafter appear.

I have discovered that carbonaceous residues obtained by the decomposition of acid sludges are not only superior reagent-catalysts for effecting the reduction of sulphur dioxide to produce elemental sulphur, but that by employing such substances, the reduction reaction may be efficiently carried out at temperatures materially less than heretofore. When the destructive distillation of acid sludges is permitted to proceed approximately to that point at which the acid constituents of the sludges are substantially broken up, the carbonaceous residues so obtained include appreciable quantities of volatile matter, chiefly hydrocarbons. I have also ascertained that these residues, containing volatile matter, constitute remarkably efficient reagent-catalysts for the production of elemental sulphur from sulphur dioxide for the reason that such residues not only act to promote the reduction reaction, but additionally serve as economical sources of reducing reagents. Although the invention contemplates utilization of the above reagent-catalysts for the reduction of sulphur dioxide irrespective of its source, in the preferred embodiment of the invention such carbonaceous residues are used for the production of elemental sulphur from sulphurous gas mixtures formed in the destructive distillation of acid sludges.

Broadly considered, the invention comprises the reduction of sulphur dioxide to elemental sulphur by contacting sulphur dioxide or gas mixtures containing the same with carbonaceous residues formed by the destructive distillation of acid sludges. By virtue of my discovery of the effectiveness of these carbonaceous residues as reducing agents or reagent-catalysts for promoting reducing reactions, I am enabled to carry out the reduction reaction at relatively low temperatures. In accordance with the preferred embodiment of my invention, the reduction reaction is effected at temperatures not substantially in excess of 650° C., and preferably at temperatures from 425°–650° C.

Since a particular application of the invention lies in the recovery of sulphur from acid sludges, one specific embodiment of the improvements constituting the invention comprises decomposing sulphuric acid sludge by heating to bring about reduction of sulphur compounds contained therein and to form a sulphur dioxide gas mixture and carbonaceous residue. The sulphur dioxide contained in the gas mixture is then reduced to elemental sulphur by contacting the gas mixture with carbonaceous residue so produced, the temperature of the reduction reaction being preferably maintained within the above prescribed limits.

The following illustrative example is given in connection with the recovery of sulphur from acid sludges.

Sulphuric acid sludges resulting from the refining of oils vary widely in composition, one representative sludge containing 45% sulphuric acid, 37% water, and 18% hydrocarbons. Although the invention is not dependent upon any particular method for the destructive distillation of acid sludge to produce sulphur dioxide gas and carbonaceous residue, decomposition of the sludge is preferably effected by externally heating a body of sludge, in a substantially air-tight retort, at relatively low temperatures, for example 150° to 325° C. On heating, the sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and oxygen. Preferably, decomposition of the sludge is effected at such relatively low temperatures as above noted, and under such conditions that destructive distillation proceeds only to approximately a point at which substantially all the sulphuric acid initially contained in the sludge is reduced. In this situation, the solid carbonaceous residues produced usually contain appreciable quantities of volatile matter, principally hydrocarbons, and in the case of some sludges the volatile matter content of the residue may run as high as 38–40%. I have found that this volatile matter content of the residue is particularly effective as a reducing agent in the subsequent reduction of sulphur dioxide. Accordingly, destructive distillation of the sludge is not preferably carried beyond the condition at which substantially all of the sulphuric acid is broken up.

The exit gases from the decomposing retort are cooled to, say 40° C. or lower if desired, and the bulk of the water and hydrocarbon vapors are condensed, and separated from the gas stream. Since decomposition of sludge is preferably effected substantially in the absence of air or other diluting gas, the retort gas mixture after separation of water and condensable hydrocarbons, is rich in sulphur dioxide. The gas may contain 75–99% sulphur dioxide, the balance consisting chiefly of carbon dioxide and uncondensed water vapor. The amount of water vapor remaining in the gas will, of course, depend largely on the extent to which the gas is cooled to condense out the water.

In accordance with this invention, the sulphur dioxide so produced is reduced to elemental sulphur by contacting the sulphur dioxide with solid carbonaceous residue resulting from the decomposition of acid sludge. The sulphur dioxide gas may be contacted with the carbonaceous residue in any suitable manner, for example, by passing a stream of the gas through a body of the residue in a reaction chamber. The sulphur dioxide gases, if cool, are preheated to about 425° C. in any desired manner, for instance, by heat exchange with hot exit gases of the reduction chamber or otherwise, and are introduced at such temperature into the reaction chamber, and passed through the body of residue therein.

Because of the catalytic properties of the carbonaceous residues, the reaction starts immediately at the relatively low temperature noted, and reduction of sulphur dioxide to sulphur by hydrocarbons proceeds. In the preferred form of the invention, the carbonaceous residues utilized are those containing substantial amounts of volatile matter consisting chiefly of hydrocarbons. When operating with this type of residue, volatile hydrocarbons in the residue are primarily utilized in the reduction of the sulphur dioxide and it appears that the reduction takes place selectively to a substantial extent, i. e., the $SO_2$ appears to be reduced first by the volatile hydrocarbons and as the volatile hydrocarbons become exhausted the temperature necessary to bring about reduction of the $SO_2$ by the non-volatile portion of the residue increases. Hence, in accordance with a preferred modification of my invention, the reduction of the sulphur dioxide is effected substantially entirely by the volatile hydrocarbon content of the residue and when the volatile matter in the residue becomes substantially exhausted, the residual coke is removed from the reaction chamber. This mode of operation permits the economical use of the volatile matter in the residue and at the same time provides for the withdrawal of the residue from a reaction chamber at about the time available volatile matter of the residue is exhausted. The residue when withdrawn from the reaction chamber at this stage may be marketed as coke or otherwise used.

When operating with a residue which, because of the nature of the sludge from which it was obtained or because of the method of decomposition, contains but little or even no volatile matter available as a reducing agent, the residue is nevertheless an efficient reagent-catalyst for reduction of sulphur dioxide, although a somewhat higher reaction temperature is preferable to when the residue contains a substantial quantity of volatile matter. For example, when the residue is low in volatile matter, the reaction may be initiated advantageously at a higher temperature, say about 500° C.

The invention further contemplates use of the residue from sludge decomposition as a reagent-catalyst for the reduction of sulphur dioxide in conjunction with a reducing gas such as methane, and I have found that the residue from sludge decomposition facilitates reduction of sulphur dioxide by reducing gases such as methane and causes the reaction to take place at temperatures lower than would be possible with the reducing gas alone.

The reaction involved in the present process is exothermic, and although reduction is initiated at the low temperature of about 425° C., the temperature tends to rise rapidly. At high temperatures, hydrogen sulphide in variable quantities is likely to be formed, and accordingly, when it is desired to avoid formation of excessive amounts of hydrogen sulphide in the exit gases of the reaction chamber, the temperature of the reaction is preferably not permitted to exceed about 650° C. I have also found that when the temperature of the reduction reaction is permitted to reach the upper portion of the preferred range, for example, about 550° C. or higher, sulphur compounds, originating in the crude oils subjected to acid treatment and appearing in the acid sludges and in the carbonaceous residues resulting from the destructive distillation of the sludges, are decomposed in the reduction chamber, and the sulphur content of such compounds is recovered, thus increasing the sulphur recovery of the process as a whole.

Temperature control of the reaction may be had in several ways, for example, by diluting the gases prior to admission to the reaction with inert gases, or by heat exchange in preheating the incoming gases, or cool sulphur dioxide gas may be introduced into the reaction chamber at an intermediate point, or provision may be made for internally or externally cooling the reaction chamber.

The exit gases of the reaction chamber contain sulphur generally as vapor, a relatively large amount of water vapor, appreciable amounts of carbon dioxide, and smaller quantities of sulphur dioxide, hydrogen sulphide, carbon monoxide and some hydrocarbons.

The sulphur may be recovered from the exit gases of the reaction chamber in any desirable manner. If the gases contain appreciable quantities of hydrogen sulphide and sulphur dioxide, the sulphur content of the exit gases may be recovered by passing the gases over a suitable catalyst, such as bauxite, to effect reaction of sulphur dioxide and hydrogen sulphide to produce sulphur. It will be understood, of course, that before passing the gas mixture into the catalyst chamber, the sulphur dioxide-hydrogen sulphide content of the gas should be adjusted to provide reacting proportions of sulphur dioxide or oxygen and hydrogen sulphide.

For illustrative purposes there are given below two specific examples showing the operation of the invention at approximately the upper and lower ends of the preferred temperature range. In both examples, the sulphur dioxide gas was diluted with water vapor to avoid excessive temperatures. The carbonaceous residue employed in each case analyzed as follows:

| | |
|---|---|
| Total acidity | 4.9% $H_2SO_4$ |
| Ash | 2.44% |
| Total volatile matter, including $H_2SO_4$ and $H_2O$ | 33.13% |
| Fixed carbon | 64.43% |

*Example 1.*—A gas mixture containing 20% sulphur dioxide and 80% water vapor, by volume, was passed through a body of carbonaceous residue in a converter chamber, and the temperature of the reaction was maintained at about 640° C. The exit gas analyzed substantially as follows:

| | Percent by volume |
|---|---|
| $SO_2$ | 2.0 |
| $H_2S$ | 2.3 |
| $S_2$ | 6.2 |
| $H_2O$ | 76.5 |
| $CO_2$ | 9.5 |
| Hydrocarbons | .5 |
| CO | 3.0 |

*Example 2.*—A gas mixture containing 51.2% sulphur dioxide, 26.8% methane, and 22% water, by volume, was passed through a body of the above noted carbonaceous residue, at temperature of about 435° C., and the exit gas of the reaction chamber analyzed as follows:

| | Percent by volume |
|---|---|
| $SO_2$ | 1.3 |
| $H_2S$ | 0.0 |
| $S_2$ | 19.4 |
| $H_2O$ | 54.4 |
| $CO_2$ | 20.4 |
| Hydrocarbons | 4.5 |
| CO | 0.0 |

From the foregoing, it will appear that substantial economic advantages are obtained in the practice of the invention. Because of the activity of the carbonaceous residues described, as reagent-catalysts, an efficient reduction of sulphur dioxide may be carried out at low temperatures. Resulting from this, operating costs are greatly decreased, since capital investment in equipment is less, and maintenance of the plant, on account of the absence of high temperatures, is materially reduced. Further, owing to the relatively low temperatures in the reducing chamber, production of hydrogen sulphide may be reduced to a minimum, where the primary object of operations is the production of a maximum amount of elemental sulphur and where it is not desired to permit the reaction to proceed far enough to form relatively large quantities of hydrogen sulphide. As noted, in addition to the catalytic properties possessed by the carbonaceous residues, the volatile matter of the latter simultaneously acts as a source of reducing agents.

I claim:

1. The method of producing elemental sulphur which comprises contacting sulphur dioxide, at elevated reacting temperatures not substantially in excess of about 650° C., with carbonaceous material formed by decomposing acid sludge.

2. The method of reducing sulphur dioxide which comprises contacting the sulphur dioxide, at elevated reactive temperatures not substantially in excess of about 650° C., with carbonaceous material formed by decomposing acid sludge.

3. The method of reducing sulphur dioxide which comprises contacting the sulphur dioxide, at temperatures not substantially less than about 425° C., and not substantially more than about 650° C., with solid carbonaceous residue formed by decomposition of acid sludge.

4. The method of reducing sulphur dioxide which comprises contacting the sulphur dioxide, at temperatures not substantially less than 425° C. and not substantially more than 650° C., with solid carbonaceous residue formed by relatively low-temperature distillation of acid sludge and containing a substantial amount of volatile matter.

5. The method of producing elemental sulphur from sulphur dioxide which comprises heating sulphur dioxide to a reactive temperature, reducing the sulphur dioxide by contacting the same with finely divided solid carbonaceous residue formed by relatively low-temperature destructive distillation of acid sludge and containing a substantial amount of volatile matter, while maintaining the temperature of the reduction reaction not substantially less than about 425° C. and not substantially more than about 650° C., withdrawing the reaction products from the reaction chamber, and recovering sulphur.

6. The method of reducing sulphur dioxide which comprises contacting sulphur dioxide, at temperatures not substantially less than about 550° C. and not substantially more than about 650° C., with solid carbonaceous residue formed by decomposition of acid sludge, whereby sulphur dioxide is reduced and sulphur contained in the carbonaceous residue is recovered.

7. The method of producing sulphur which comprises heating acid sludge to form sulphur dioxide and solid carbonaceous residue, and contacting the sulphur dioxide, at elevated reactive temperatures above that to which the sludge is heated and not substantially in excess of about 650° C. with the carbonaceous residue so formed to produce sulphur.

8. The method of producing sulphur which comprises decomposing acid sludge by heating to temperatures of not more than about 325° C. to form sulphur dioxide and carbonaceous residue containing volatile matter, reducing the sulphur dioxide to sulphur by contacting the sulphur dioxide with carbonaceous residue so formed while maintaining the reduction reaction at reactive temperatures above that at which the decomposition of the sludge is effected and not substantially in excess of about 650° C.

9. The method of producing sulphur which comprises decomposing acid sludge by heating to temperatures of about 150°–325° C. to produce sulphur dioxide and solid carbonaceous residue containing volatile matter, reducing the sulphur dioxide to sulphur by contacting the sulphur dioxide with the carbonaceous residue while maintaining the reduction reaction at temperatures not less than about 425° C. and not substantially more than about 650° C., and separating sulphur from the reaction gases.

10. The method of reducing sulphur dioxide which comprises contacting the sulphur dioxide at elevated reactive temperatures not substantially in excess of about 650° C. with solid carbonaceous reducing material derived from acid treatment of petroleum.

11. The method of reducing sulphur dioxide which comprises contacting the sulphur dioxide at temperatures not substantially less than about 425° C. and not substantially more than about 650° C., with solid carbonaceous material derived from acid treatment of petroleum.

12. The method of producing elemental sulphur from sulphur dioxide which comprises heating sulphur dioxide to a reactive temperature, reducing the sulphur dioxide by contacting the same with solid carbonaceous reducing material derived from acid treatment of petroleum while maintaining the temperature of the reduction reaction not substantially less than about 425° C. and not substantially more than 650° C., withdrawing the reaction products from the reaction zone, and recovering sulphur.

BERNARD M. CARTER.